United States Patent [19]
Johanson

[11] 3,711,105
[45] Jan. 16, 1973

[54] TOOL HOLDING SYSTEM

[76] Inventor: Lars Johanson, c/o Eltee Inc., 19 Fairfield Place, West Caldwell, N.J. 07006

[22] Filed: Nov. 12, 1970

[21] Appl. No.: 88,851

[52] U.S. Cl. ................... 279/1 R, 279/1 L, 219/69 E
[51] Int. Cl. ......................... B23b 31/02, B23k 37/00
[58] Field of Search ....219/69 R, 69 E; 279/1 R, 1 A, 279/1 L

[56] References Cited

UNITED STATES PATENTS

| | | | |
|---|---|---|---|
| 3,474,215 | 10/1969 | Johanson | 219/69 E |
| 3,271,848 | 9/1966 | Montandon | 219/69 E X |
| 2,860,882 | 11/1958 | Whitney | 279/1 R X |

*Primary Examiner*—Gil Weidenfeld
*Attorney*—Clarence A. O'Brien and Harvey B. Jacobson

[57] ABSTRACT

A tool holder primarily designed for use in conjunction with EDM machines and also capable of functioning in conjunction with other machines where repeated tool positioning is desired. The tool holder includes a base portion for semi-permanent securement to the associated machine and includes a tool mounting surface having spherical projections disposed at the apices of an equilateral triangular area on the mounting surface. An indexing pin also projects outwardly of the mounting surface and a tool holding or test bar section is provided including a mounting surface in which three recesses are formed at the apices of an equilateral triangular zone of the same size as the first-mentioned zone, the projections being seatingly receivable in the recesses with the opposing mounting surfaces disposed in at least slightly spaced relation. The mounting surface of the tool holding or test bar section is provided with a bore for receiving the indexing pin and coacting structure is provided in the centers of the aforementioned zones for drawing the tool holding or test bar section toward the mounting surface of the base or body of the tool holder. This coacting structure is of the type wherein substantially equal forces may be applied to draw the tool holding or test bar section toward the base section during each instance of use of the tool holder.

12 Claims, 5 Drawing Figures

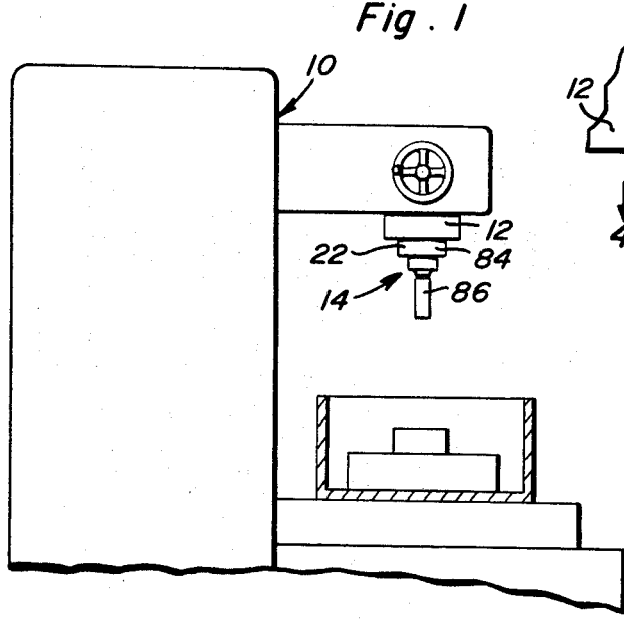
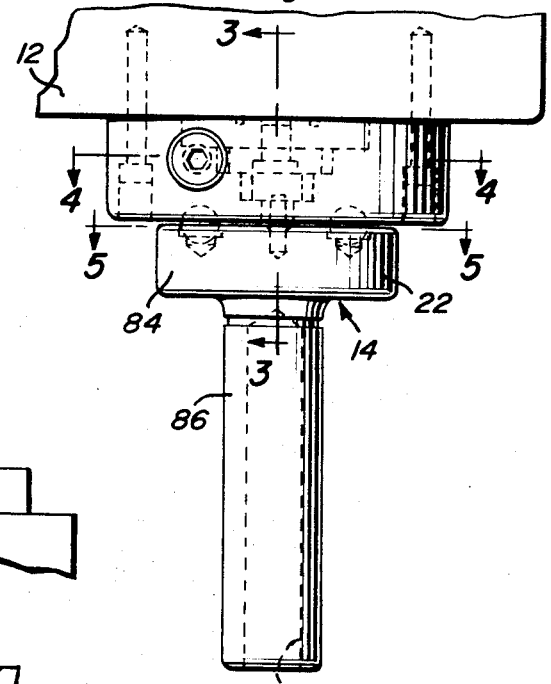
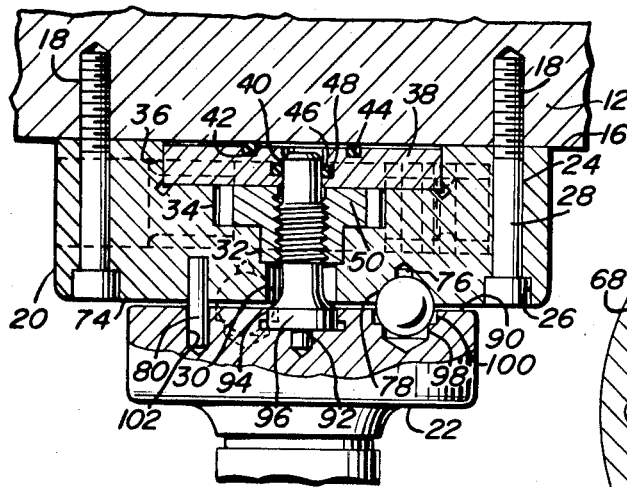
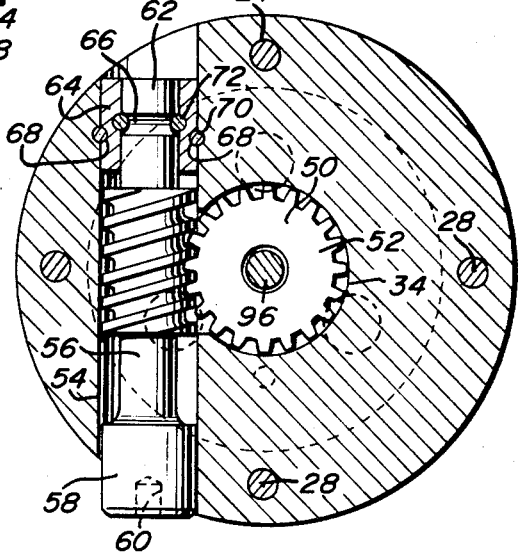
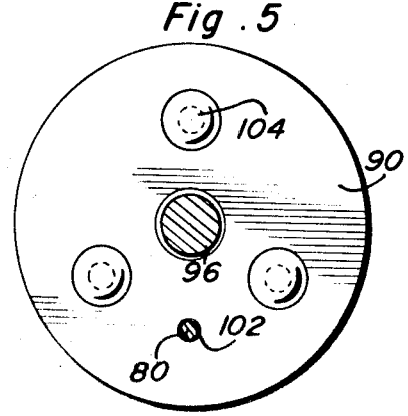
Lars Johanson
INVENTOR

TOOL HOLDING SYSTEM

The tool holding system of the instant invention has been specifically designed for use in conjunction with EDM machines but may also be utilized in conjunction with other types of machines where close tolerances in repeated tool holding operations must be maintained. The tool holding system of the instant invention has been found to be capable of repeated mounting of test bars and tools at five inch distances from the opposing surfaces of the mounting and tool holder sections within a total lateral tolerance of ten micro-inches, as long as the tolerances of the various parts of the system are maintained within 0.0002 inch.

The tool holding system of the instant invention illustrated and described hereinafter utilizes a screw member to draw the tool holding or test bar section toward the base section, but other means such as magnetic means may be utilized if it is desired to maintain the forces drawing the tool holding and test bar sections toward the base section substantially the same during each operation of the tool holding system.

The main object of this invention is to provide a tool holding system which will be capable of repeated accurate positioning of test bar and tool holders relative to an associated machine.

Another object of this invention is to provide a tool holding system in accordance with the preceding object specifically designed for use in conjunction with EDM machines.

Yet another object of this invention is to provide a tool holding system which will be readily adaptable for the purpose of holding various types of tools.

A final object of this invention to be specifically enumerated herein is to provide a tool holding system which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary elevational view of a conventional form of EDM machine including a mounting head from which a test bar is supported by means of the tool holding system of the instant invention;

FIG. 2 is an enlarged elevational view of the EDM machine head illustrating more clearly the tool holding system supporting a test bar from the machine head;

FIG. 3 is an enlarged fragmentary vertical sectional view taken substantially upon the plane indicated by the section line 3—3 of FIG. 2;

FIG. 4 is an enlarged horizontal sectional view taken substantially upon the plane indicated by the section line 4—4 of FIG. 2; and FIG. 5 is an enlarged horizontal sectional view taken substantially upon the plane indicated by the section line 5—5 of FIG. 2.

Referring now more specifically to the drawings, the numeral 10 generally designates a conventional form of EDM machine including a head 12 from which the tool holding system of the instant invention, generally referred to by the reference numeral 14 is supported.

With reference now more specifically to FIGS. 2 through 5 of the drawings, it will be seen that the head 12 includes a planar mounting surface 16 in which a plurality of threaded blind bores 18 are formed. The bores 18 equal four in number and may, for convenience sake, be positioned at the apices of a square area of the mounting surface 16. However, the number and placement of the bores 18 is not critical.

The tool holding system 14 includes a base section 20 and a test bar section 22. The base section 20 may be of any suitable plan shape but is illustrated in the drawings as being circular in plan shape. The base section 20 has a plurality of bores 24 formed therethrough including counterbores 26 and the bores 24 are registrable with the bores 18 and a plurality of headed machine screws 28 are utilized to semi-permanently secure the base section 20 to the mounting surface 16 of the head 12.

The base section 20 has a central bore 30 formed therethrough including a first counterbore 32, a second counterbore 34, and a third counterbore 36. The counterbores 32, 34 and 36 open upwardly toward the mounting surface 16 beneath which the base section 20 is secured and a guide disk 38 having a central bore 40 formed therethrough is seated in the third counterbore 36. The guide disk 38 includes an upwardly opening annular groove 42 in which an O-ring 44 is seated and the bore 40 includes a circumferential groove 46 intermediate its opposite ends in which an O-ring 48 is seated.

A shouldered worm wheel 50 is seated in the first and second counterbores beneath the guide disk 38 and includes a central threaded bore 52.

In addition, the base section 20 has a bore 54 formed therethrough disposed generally normal to the bore 30 and lying generally upon a cord of the second counterbore 34. In addition, the bore 54 opens into one side of the second counterbore 34 and a worm gear 56 is journaled in the bore 54 and meshed with the worm wheel 50. One end of the worm gear 56 includes a head 58 having a hexagonal blind bore 60 formed therein whereby a suitable tool may be utilized to impart torque to the worm gear 56 and the other end of the worm gear 56 includes a reduced diameter shank portion 62 journaled in a sleeve 64. The shank portion 62 includes a circumferential groove 66 and diametrically opposite portions of the sleeve 64 include grooves 68 whose center lines are generally tangent to the bore 54. A pair of retaining pins 70 are secured in the base section 20 and received in the grooves 68 to retain the sleeve 64 in position within the bore 54 and a second pair of pins 72 are secured in bores tangent to the interior surfaces of the sleeve 64 at diametrically opposite locations and loosely received in diametrically opposite portions of the groove 66 whereby all but slight axial shifting of the worm gear 56 in the bore 54 is prevented.

The face 74 of the base section 20 remote from the mounting surface 16 defines a mounting face 74 and the mounting face 74 has three blind bores 76 formed therein including hemispherical enlarged portions 78 at their outer ends which open outwardly through the mounting face 74. The bores 76 are positioned at the apices of an equilateral triangular zone on the mounting face 74 and a locating pin 80 is secured in the base section 20 and projects perpendicularly from the mounting face 74 at a position eccentrically disposed relative to the center of the aforementioned triangular zone or area.

The test bar section 22 includes a cylindrical base portion 84 and a test bar portion 86 which projects centrally downwardly from the underside of the base portion 84 and includes a downwardly opening blind bore 88. The test bar portion 86 is cylindrical and the upper end face of the base portion 84 is designated by the reference numeral 90 and defines a mounting surface disposed generally parallel to and opposing the mounting face 74.

A blind bore 92 is formed in the mounting surface 90 and includes a counterbore 94 in which an upstanding screw shank 96 is fixedly secured. The screw shank 96 is disposed perpendicular to the mounting surface 90 and threadedly engaged in the bore 52 formed in the worm wheel 50.

The mounting surface 90 also has three bores 98 formed therein at the apices of an equilateral triangular zone or area of the same size as that defined by the bores 76 and the bores 98 include counterbores 100. In addition, the base portion 84 has a blind bore 102 formed therein disposed eccentrically relative to the bore 92 and in which the locating pin 80 is receivable when the counterbores 100 are in perfect registry with the hemispherical enlargement 78. Three spherical members 104 are seated in the spherical enlargement 78 and in the inner ends of the counterbores 100 and the worm gear 56 is tightened in order to thread the worm wheel 50 downwardly upon the screw shank 96 whereby the base portion 84 of the test bar section 22 is drawn tightly upwardly toward the base section 20.

Of course, the test bar section 22 may be replaced by a tool holder of similar configuration but including means, in lieu of the test bar portion 86, for holding a tool such as an electrode. The indexing pin 80 and bore 102 ensure that the spherical members 104 will be seated in the same hemispherical enlargement 78 and counterbores 100 and if the same torque is applied to the worm gear 56 at each instance of use, the lower end of the test bar 86 may be repeatedly positioned within a total lateral displacement of 10 micro-inches, as long as the various parts of the tool holding system are fabricated to within 0.0002 inch tolerance. Thus, it may be seen that an extremely accurate tool holding system has been provided with the ability of repeatability with little effort and with extreme accuracy.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mounting structure for repeatedly removably securing an article to a support member with the article disposed in substantially the same position relative to the support member after each mounting procedure, said mounting structure comprising a base section including means for semi-permanently rigidly securing said base section to said support member, an article support section for supporting said article, said sections including coacting means operable to repeatedly removably rigidly secure said article support section to said base section with said article support section precisely positioned in the same orientation relative to said base section after each mounting procedure, said coacting means including opposing first and second surfaces of said base and article support sections, respectively, one of said surfaces including three projections arranged at the apices of a first triangular area of said one surface, the other of said surfaces including three recesses arranged at the apices of a second identical area of said other surface and in which said projections are seatingly receivable with said surfaces disposed in at least slightly spaced apart relation, said coacting means further including first and second portions of said sections coacting to draw said sections together along a line extending therebetween and at least generally centrally through said areas.

2. The combination of claim 1 wherein first and second portions comprise a threaded shank carried by one of said sections and extending along said line toward the other section and a threaded nut journaled from said other section and threadedly engaged with said shank.

3. The combination of claim 1 wherein said projections and recesses are disposed in corresponding parallel planes disposed normal to said line.

4. The combination of claim 3 wherein said projections are removably seated in recesses formed in the corresponding section, opening outwardly of said one surface and disposed at the apices of said first area.

5. The combination of claim 1 wherein said first and second portions comprise a threaded shank carried by one of said sections and extending along said line toward the other section and a threaded nut journaled from said other section and threadedly engaged with said shank, said nut having peripheral teeth and defining a worm wheel, and a worm gear journaled from said other section and meshed with said worm wheel.

6. The combination of claim 1 wherein said projections and recesses are disposed in corresponding parallel planes disposed normal to said line, one of said surfaces including a blind bore generally paralleling and spaced laterally of said line, said other surface having an indexing pin projecting outwardly therefrom and snugly telescoped into said bore.

7. The combination of claim 6 wherein first and second portions comprise a threaded shank carried by one of said sections and extending along said line toward the other section and a threaded nut journaled from said other section and threadedly engaged with said shank.

8. The combination of claim 7, wherein said projections are removably seated in recesses formed in the corresponding section, opening outwardly of said one surface and disposed at the apices of said first area.

9. The combination of claim 1 wherein said first and second portions comprise a threaded shank carried by one of said sections and extending along said line toward the other section and a threaded nut journaled from said other section and threadedly engaged with said shank, said shank being carried by and projecting outwardly from said article support section, said base section having a bore formed therethrough extending along said line and in which said shank is received, said bore including first and second counterbores opening toward said support member, said nut being journaled in said first counterbore, said shank projecting through said nut and having a smooth cylindrical terminal end portion, a guide disk seated in said second counterbore and having a central bore formed therethrough, said terminal end portion being journaled in said central bore.

10. A mounting structure for repeatedly removably securing an article to a support member with the article disposed in substantially the same position relative to the support member after each mounting procedure, said mounting structure comprising a base section including means for semipermanently rigidly securing said base section to said support member, an article support section for supporting said article, said sections including coacting means operable to repeatedly removably rigidly secure said article support section to said base section with said article support section precisely positioned in the same orientation relative to said base section after each mounting procedure, said coacting means including first and second sides of said base and article support sections, respectively, one of said sides including more than two projections arranged in a predetermined pattern, the other of said sides including an equal number of recesses arranged in the same pattern and in which said projections are seatingly receivable with said sides disposed in at least slightly spaced apart relation, said coacting means further including first and second portions of said sections coacting to draw said sections together along a line extending therebetween, and at least centrally through the areas bound by said projections and recesses.

11. The combination of claim 10 wherein said projections and recesses are arranged in regular patterns defining areas through whose centers said line extends.

12. The combination of claim 11 wherein said projections and recesses are arranged at the corners defined by adjacent sides of equilateral polygonal areas.

* * * * *